(12) United States Patent
Kaikuranta et al.

(10) Patent No.: US 6,834,181 B2
(45) Date of Patent: Dec. 21, 2004

(54) MOBILE COMMUNICATION DEVICE AND RELATED CONSTRUCTION METHOD

(75) Inventors: Terho Kaikuranta, Piispanristi (FI); Seppo Salminen, Turku (FI); Heikki Halkosaari, Paimio (FI); Jussi Hakunti, Piispanristi (FI)

(73) Assignee: Nokia Corporation, Espoo (FI)

( * ) Notice: Subject to any disclaimer, the term of this patent is extended or adjusted under 35 U.S.C. 154(b) by 314 days.

(21) Appl. No.: 10/099,476

(22) Filed: Mar. 13, 2002

(65) Prior Publication Data

US 2004/0203997 A1 Oct. 14, 2004

(51) Int. Cl.[7] .............................. H04M 1/00; H04B 1/38
(52) U.S. Cl. ................ 455/90.3; 455/575.1; 455/575.5; 455/575.7; 455/575.8; 455/569.1
(58) Field of Search .................. 455/90.3, 575.1–575.9, 455/569.2, 550.1, 569.1; 343/700 R, 702, 872, 873; 381/370–371, 345, 347–348, 350–351

(56) References Cited

U.S. PATENT DOCUMENTS

| | | | |
|---|---|---|---|
| 3,742,442 A | * | 6/1973 | Leyde et al. .................. 340/15 |
| 4,291,311 A | * | 9/1981 | Kaloi ........................ 343/700 |
| 4,679,233 A | * | 7/1987 | Richardson et al. ........ 379/451 |
| 5,555,449 A | | 9/1996 | Kim |
| D374,875 S | | 10/1996 | Graves |
| 6,025,805 A | | 2/2000 | Smith et al. |
| 6,201,501 B1 | | 3/2001 | Arkko et al. |
| 6,268,831 B1 | | 7/2001 | Sanford |
| 6,333,716 B1 | | 12/2001 | Pontoppidan |
| 6,346,925 B1 | | 2/2002 | Matsumoto |
| 6,377,827 B1 | * | 4/2002 | Rydbeck ..................... 455/575 |
| 6,559,802 B2 | * | 5/2003 | Goto et al. ................. 343/702 |
| 6,577,278 B1 | | 6/2003 | Hood et al. |
| 6,687,120 B2 | * | 2/2004 | Hood et al. ................. 361/683 |
| 2002/0019247 A1 | * | 2/2002 | Egorov ...................... 455/557 |
| 2003/0003970 A1 | * | 1/2003 | Johnson et al. ............ 455/569 |
| 2003/0072131 A1 | * | 4/2003 | Hood et al. ................. 361/683 |

FOREIGN PATENT DOCUMENTS

JP        6-224816        8/1994

* cited by examiner

Primary Examiner—William Trost
Assistant Examiner—Meless N Zewdu
(74) Attorney, Agent, or Firm—Ware, Fressola, Van Der Sluys & Adolphson LLP

(57) ABSTRACT

Mechanical design considerations for the antenna and speaker functionalities in a mobile communication device are combined in the construction to reduce the physical size of the device. The antenna and speaker are carried in a common chamber which enhances bass-tone production of the speaker while maintaining antenna functional design consideration.

15 Claims, 3 Drawing Sheets

MOBILE COMMUNICATION DEVICE AND RELATED CONSTRUCTION METHOD

BACKGROUND OF THE INVENTION

The present invention relates generally to the field of mobile communication devices and deals more particularly with a package and housing design that combines the mechanical design considerations for the RF and acoustic functionalities to reduce the overall physical size of the device and enhance accoustic performance.

The growth in the use of portable electronic devices such as, for example mobile communication devices, cellular telephones and the like, has driven the design of such devices to become smaller and more convenient. Consumers have become accustomed to the convenience and portability of such electronic devices, particularly, cellular telephones and have demanded that those cellular telephones become even more convenient and even more portable. The constant thrust in cellular telephone design is to make them as small as possible. One way that has resulted in a reduction in the size of the cellular telephone housing has been to reduce the size of the battery pack powering the device. However, the reduction in the size of the device based solely on reduction of battery size is not sufficient to meet the requirements of providing very small or smaller devices than currently available.

There is also an increasing demand that mobile communication devices operate in a "hands-free" mode, that is, the device is operational without holding it up to the user's ear. The increased demand for "hands-free" operation is due in large part to safety considerations, particularly for example, when operating a motor vehicle and the like and attempting to carry on a conversation. An increasing number of jurisdictions are attempting to regulate and control the usage of mobile communication devices while operating a motor vehicle and thus there is a need to provide such "hands-free" operation. The desire for "hands-free" operation of the mobile communication device demands that the acoustic performance and characteristics be enhanced to improve audio and sound quality to hear the received audio without holding the receiver to the user's ear.

Conventional and commonly known and used mobile communication devices generally include an internal antenna and a speaker component. The mechanical design and operational considerations for the antenna and speaker must be taken into account to insure the proper operation of each to obtain the desired results. The internal antenna includes an RF-emitter that is generally held or located in a spaced separation with respect to a ground plate mounted in the chassis of the device. The RF-emitter electrically connects to the operational electronic circuitry of the mobile communication device and the spaced separation between the RF-emitter and the ground plate area defines the mechanical outline of an antenna chamber volume.

The speaker component is located separate and away from the RF-emitter to prevent interference with the emitter. It is a current requirement that the speaker component provide a sufficiently high air displacement and pressure to produce audible sounds loud enough to implement a "hands-free" operation. Typically, the speaker is mounted in an enclosure of some sort defining a chamber which functions as an acoustic resonator to enhance bass-tone production. The physical size or volume of the chamber influences the audio quality, and a larger volume generally results in better audio quality. A drawback with traditional speaker components meeting these requirements is their large physical size. Improved speaker components that are physically smaller in size than the traditional speaker components and having comparable performance have been developed however, these newer speakers require a "controlled" back cavity to operate properly. Providing the back cavity to allow usage of these improved speaker components would require the mobile communication device to become larger in size rather than smaller. As a result, both the internal antenna and the speaker component impose separate mechanical design requirements that add to the overall physical size of the mobile communication device.

Therefore, there is a need to identify further construction methods and designs that provide the desired overall physical size reduction and yet provide a chamber having a desired volume to enhance acoustic characteristics and performance of the speaker component of a mobile communication device.

Accordingly, it would be desirable to have the antenna and speaker share at least a portion of the volume required for the antenna to provide the RF functionality, with the speaker to provide the acoustic functionality of the mobile communication device to further reduce the size of the mobile communication device.

Therefore, it is a general object of the present invention to provide a mechanical design that reduces the size of the mobile communication device.

It is a further object of the present invention to provide a design method to combine the RF functionality and accoustic functionality of the mobile communication device.

It is another object of the present invention to provide a reduced size mobile communication device by sharing a common physical volume for both the antenna and the speaker that accommodates the mechanical design requirements of the antenna and speaker, respectively.

It is a yet further object of the present invention to provide a reduced size mobile communication device wherein the antenna volume chamber provides the required back cavity for the speaker component.

SUMMARY OF THE INVENTION

In accordance with a first aspect of the invention, a mobile communication device of the type having a RF transmitter and receiver, a RF antenna and a speaker component includes a housing for carrying subassemblies comprising an operational communication device. The housing itself is generally a contoured case that has an exterior surface and an interior surface. The interior surface forms and defines an interior cavity within the housing for carrying both a speaker component and a RF antenna.

Preferably, the RF antenna is a planar antenna.

Preferably, the interior cavity is an acoustical cavity.

Preferably, the planar antenna defines an internal antenna for providing RF functionality.

In accordance with a further aspect of the invention, a mobile communication device has antenna functionality and speaker functionality and includes a housing for carrying subassemblies of the operational communication device. The housing has an interior cavity of a predetermined volume for providing the antenna functionality and speaker functionality.

Preferably, the interior cavity has a covering and a planar antenna is carried on a surface of the covering.

Preferably, the planar antenna is carried on an outer surface of the covering.

Preferably, the planar antenna is carried on an inner surface of the covering.

Preferably, the interior cavity is an acoustic resonator.

Preferably, the interior cavity has at least one acoustic leak hole for emitting sound produced by the speaker functionality.

In another aspect of the invention, a reduced size mobile communication device includes a housing for carrying subassemblies defining the operational communication device. Speaker means are provided for producing audible signals, and antenna means are provided for transmitting and receiving RF signals. Cavity means within the housing carry both the speaker means and the antenna means. Additionally, the cavity means defines a common shared chamber that functions as an acoustic resonator chamber and an antenna-ground plate separation chamber.

Preferably, the antenna is a planar antenna.

Preferably, the speaker is an audio transducer.

A yet further aspect of the invention relates to a method for construction of a mobile communication device having combined antenna and speaker component functionalities. The method for construction comprises the steps of: providing an antenna supporting structure having an outer wall surface generally transverse to peripheral walls extending therefrom; terminating the peripheral wall ends at the intersection with the surface of a ground plate thereby defining a first interior chamber volume between the outer wall, peripheral walls and ground plate; mounting and locating a speaker component between the ground plate and a wall surface of the communication device in a region generally defined by the projection of the outline surface area of the antenna supporting structure first wall and peripheral walls on the communication device wall surface; and providing means for communication between the first interior chamber volume and the speaker component to define a controlled volume back cavity to provide a larger volume acoustic resonator chamber for air displaced by the speaker component to enhance the acoustic performance of the speaker component without increasing the size of the mobile communication device.

Preferably, the method further includes the step of providing a substantially pressure-sealed first interior chamber volume.

Preferably, the method further includes the step of providing a printed circuit board for carrying electrical components defining the operational communication device and locating the printed circuit board within the first interior chamber volume.

Preferably, the method for construction further includes the steps of locating the printed circuit board in a spaced relationship between the first wall and the ground plate; sealing the seam defined by the peripheral marginal edges of the printed circuit board and the corresponding intersection of the inner surface of the peripheral walls of the antenna supporting structure; and providing means in the printed circuit board for communication between the first and second chamber portions created in the first interior chamber volume by the printed circuit board located therein, whereby air displaced by the speaker component communicates with the controlled volume back cavity defined within the first interior chamber volume.

Preferably, the method for construction further includes the step of providing a planar antenna on the first wall outer surface.

BRIEF DESCRIPTION OF THE DRAWINGS

Other objects, features and benefits of the present invention will become readily apparent from the following written detailed description taken together with the drawings forming a part thereof, wherein.

DETAILED DESCRIPTION OF PREFERRED EMBODIMENTS

Figure 1:
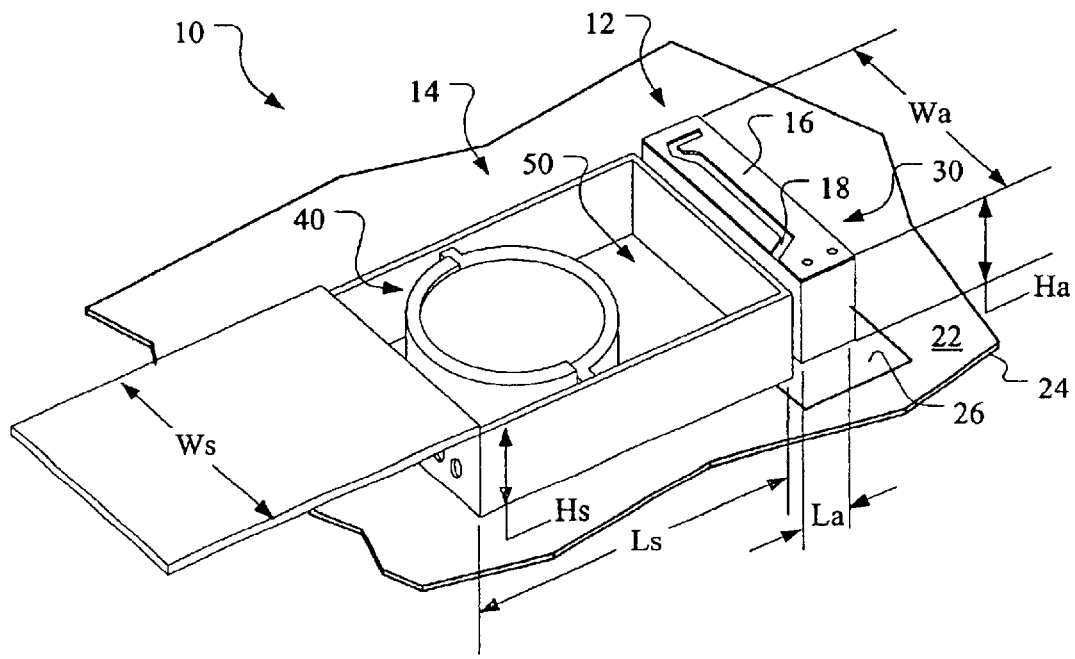
FIG. 1 is a schematic representation of a portion of a mobile communication device showing prior art construction with a separate antenna chamber and a separate speaker chamber.

Turning now to the drawings and considering the invention in further detail, a schematic representation of a portion of a mobile communication device showing prior art construction with a separate antenna chamber and a separate speaker chamber is illustrated therein and generally designated 10. The mobile communication device 10 includes an antenna section generally designated 12, and a speaker section, generally designated 14. The antenna section 12 includes a planar antenna 16 carried on a surface 18 of a substrate to provide rigidity to the planar antenna which may be printed or deposited thereon in a manner well known to those skilled in the art of mobile communication devices. The antenna 16 is connected in a normal manner to the operational electronic circuitry defining the mobile communication device.

The antenna 16 or the substrate carrying the antenna is held or otherwise mounted in a generally fixed and spaced relationship with respect to a surface 22 of a substrate, such as an electrical printed circuit board, generally designated 24, shown partially cut away. The printed circuit board 24 is well known to those skilled in the art and may take on many different forms and shapes to accommodate the packaging of the mobile communication device. A ground plane or plate 26 is carried on at least a portion of the surface 22 and in a spaced relation to the planar antenna 16. The ground plate can also be metallized paint or other conductive materials to carry out the intended function, and which materials are well known to those skilled in the art of RF transmission. The planar antenna 16 is internal to the mobile communication device 10 and is mechanically constructed so that there is an electrically functioning conductive portion which functions as an RF-emitter.

To operate properly, the RF-emitter of the antenna 16 is mechanically placed or constructed such that there are no electrical conductors or dielectric materials near the emitter. In the prior art design shown in FIG. 1, the ground plane 26 prevents the inadvertent or unintentional placement of electrically conducting material such as circuit paths and electrical components in the vicinity of or beneath the RF-emitter of the antenna 16. Thus, to ensure the RF functionality of the antenna 16, a cavity or open space defining an antenna volume chamber, generally designated 30, is created between the antenna 16 and the ground plane 26. The shape of the antenna chamber 30 follows generally the shape of the RF-emitter material used in the antenna 16.

The size or volume of the antenna chamber 30 is also considerably larger than the size of the antenna 16. In the illustrated example, the area projected onto the surface 22 corresponds to the length $L_A$ and width $W_A$ of the antenna. The volume of the antenna chamber is determined by the height $H_A$ multiplied by the area.

The speaker section 14 of the mobile communication device 10 includes a speaker component, generally designated 40, located in a speaker chamber 50. The size or volume of the speaker chamber 50 is determined and selected to provide the desired acoustic characteristics from the speaker. The volume of the speaker chamber 50 in the illustrated example is the length $L_S$, width $W_S$ and height $H_S$, and these parameters are selected to meet the size restrictions imposed by the mechanical physical design. Although the speaker chamber 50 is indicated as a single cavity, multiple cavities around the speaker can be provided such that the total volume of the separate cavities provide the desired total chamber volume to achieve the desired acoustic characteristics. Larger chamber volumes enhance the bass-tone production and function as an acoustic resonator enhancing low frequencies of the audio spectrum. The size and shape of the speaker chamber 50 is not critical provided the volume of the chamber is sufficient so that air can freely move inside of the chamber to achieve proper operation of the speaker 40. The speaker 40 may be of any well known audio transducer or conventional construction, but preferably is of the type requiring a controlled volume back cavity to provide the desired results of the present invention.

As illustrated in the prior art construction shown in FIG. 1, the speaker chamber 50 is a separate chamber from the antenna chamber, and the speaker 40 is in a spaced relationship to the antenna chamber 30 so as to prevent interference with the antenna 16. The volume or space required for the speaker and antenna with the prior art construction is the sum of the volume of the speaker chamber 50 and the volume of the antenna chamber 30, and the overall length is $L_S+L_A$.

Figure 2:
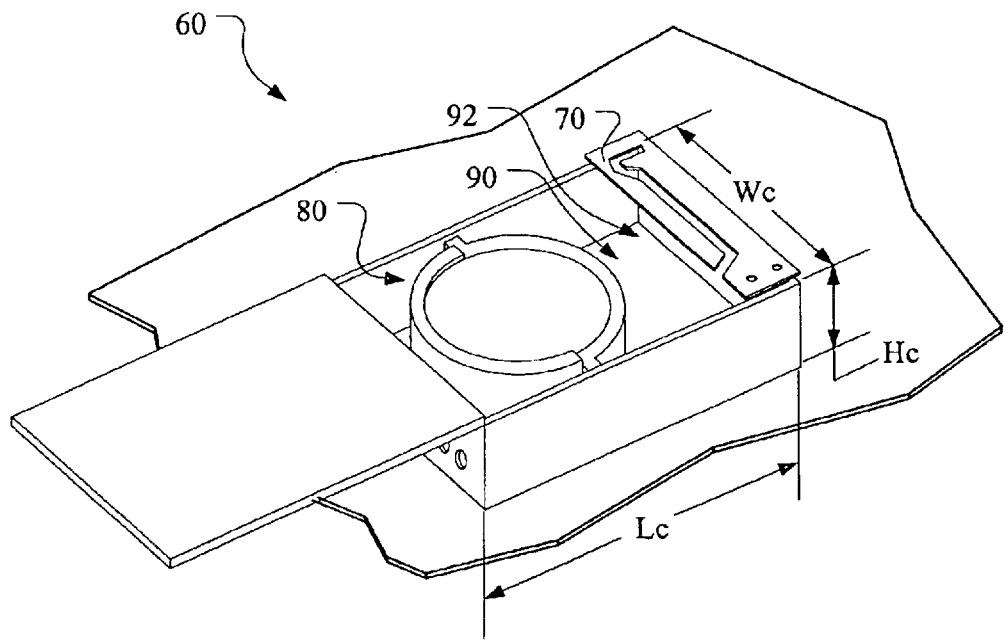
FIG. 2 is a schematic representation of a portion of a mobile communication device showing the combined antenna-speaker chamber embodying the present invention.

Turning now to FIG. 2, a schematic representation of a portion of a mobile communication device showing the combined antenna-speaker chamber embodying the present invention is illustrated therein and generally designated 60. As illustrated in FIG. 2, the planar antenna 70 and speaker 80 share a common cavity or chamber 90 with a portion 92 of the chamber 90 located in the chamber 90 in the area beneath the antenna 70. The construction of the present invention combines the separate antenna and speaker chambers, as discussed above in connection with the prior art, into a single mechanical combination that meets both the acoustic requirements and the RF requirements of the mobile communication device. The volume of the chamber 90 is given by the width $W_C$×height $H_C$×length $L_C$, where $L_C$ is less than $L_S+L_A$. The acoustics for the speaker 80 are imposed by utilizing the volume 92 beneath the planar antenna 70 to provide an increased physical volume to achieve the desired acoustic results.

A typical antenna RF-emitter is a very thin foil type plating on an insulating substrate, and therefore the antenna chamber volume beneath the antenna can be included with the volume of the speaker chamber which improves the bass tone performance of the speaker due to the increased volume available for the speaker functionality. Because the antenna chamber volume by itself cannot be reduced due to the RF requirements of the antenna to prevent interference with the RF-emitter, the antenna chamber volume cannot be reduced as a possible source to realize a size reduction in the device. However, as discussed above, the antenna chamber volume can be a part of the speaker chamber volume, and thus the total combined volume for the speaker and antenna is less than the two separate volumes of the antenna and the speaker as is required in the prior art construction.

Figure 3:
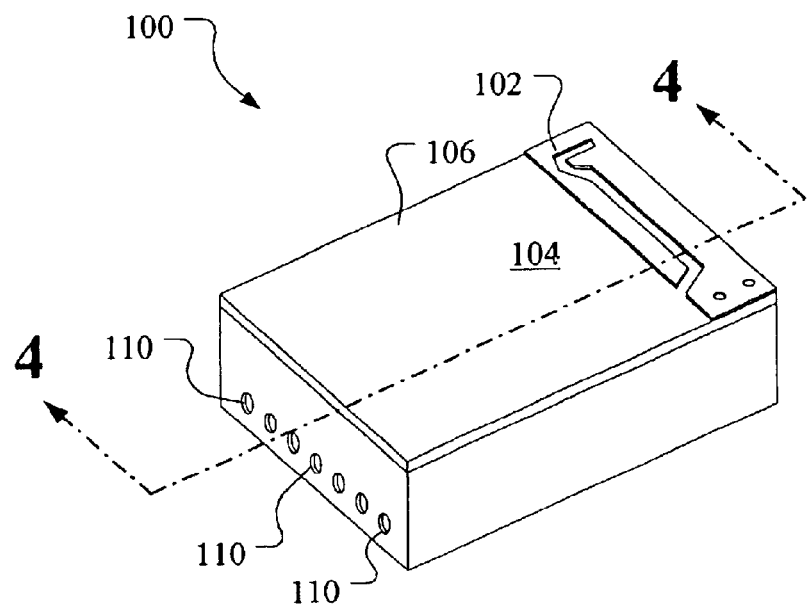
FIG. 3 is a schematic representation of the antenna-speaker chamber of FIG. 2 with a cover in place and the planar antenna carried on the outer surface of the cover.

Turning now to FIG. 3, a schematic representation of the antenna-speaker chamber of FIG. 2 is shown with a cover in place and is generally designated 100. A planar antenna 102, such as described above, is carried on the outer surface 104 of the cover, generally designated 106. The cover 106 encloses the chamber in which the speaker component is located. The material of the cover 106 is selected so that it does not interfere with the RF-emitter performance of the antenna 102. The material can be that of the A-cover, molded plastics and other materials well known to those skilled in the art. The surface 104 of the cover 106 functions as the substrate upon which the RF-emitter foil is printed or plated. Sounds produced by the speaker are emitted through the acoustic leak holes 110 extending through the wall portion 112 of the antenna-speaker chamber.

Figure 4:
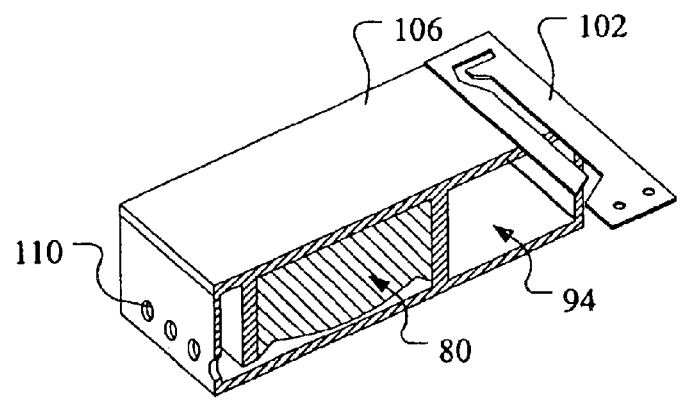
FIG. 4 is a partial cut-away cross-sectional view along the line 44 of FIG. 3.

Turning to FIG. 4, a partial cut-away cross-sectional view along the line 44 of FIG. 3 is illustrated therein and shows the speaker component 80, the combined antenna-speaker chamber 94, cover 106 and the planar antenna 102.

It will be recognized and appreciated by those skilled in the art that the above schematic representations are provided for illustrative purposes only to explain the features and benefits of the present invention. It will be recognized that the mechanical structural elements forming the antenna-speaker chamber can be integral with the interior of the housing for the mobile communication device and produced as a part of the plastic injection molding process or other manufacturing process techniques employed either now known or future-developed. The important idea to be carried away from the above disclosure is the combination of the otherwise separate speaker chamber and antenna chamber to reduce the overall size of the mobile communication device. The additional volume added to the speaker chamber as the result of combining the antenna chamber volume increases the speaker chamber volume to enhance the bass tone production of the speaker.

The construction method of the present invention includes providing an antenna-speaker chamber or cavity within the interior of the housing of the mobile communication device and locating the speaker component within the antenna-speaker chamber such that the speaker does not interfere with the operation of the RF-emitter of a planar antenna carried on a surface of a covering substrate enclosing the speaker within the antenna-speaker chamber. Acoustic leak holes are provided through the chamber wall to emit sounds produced by the speaker component.

Figure 5:
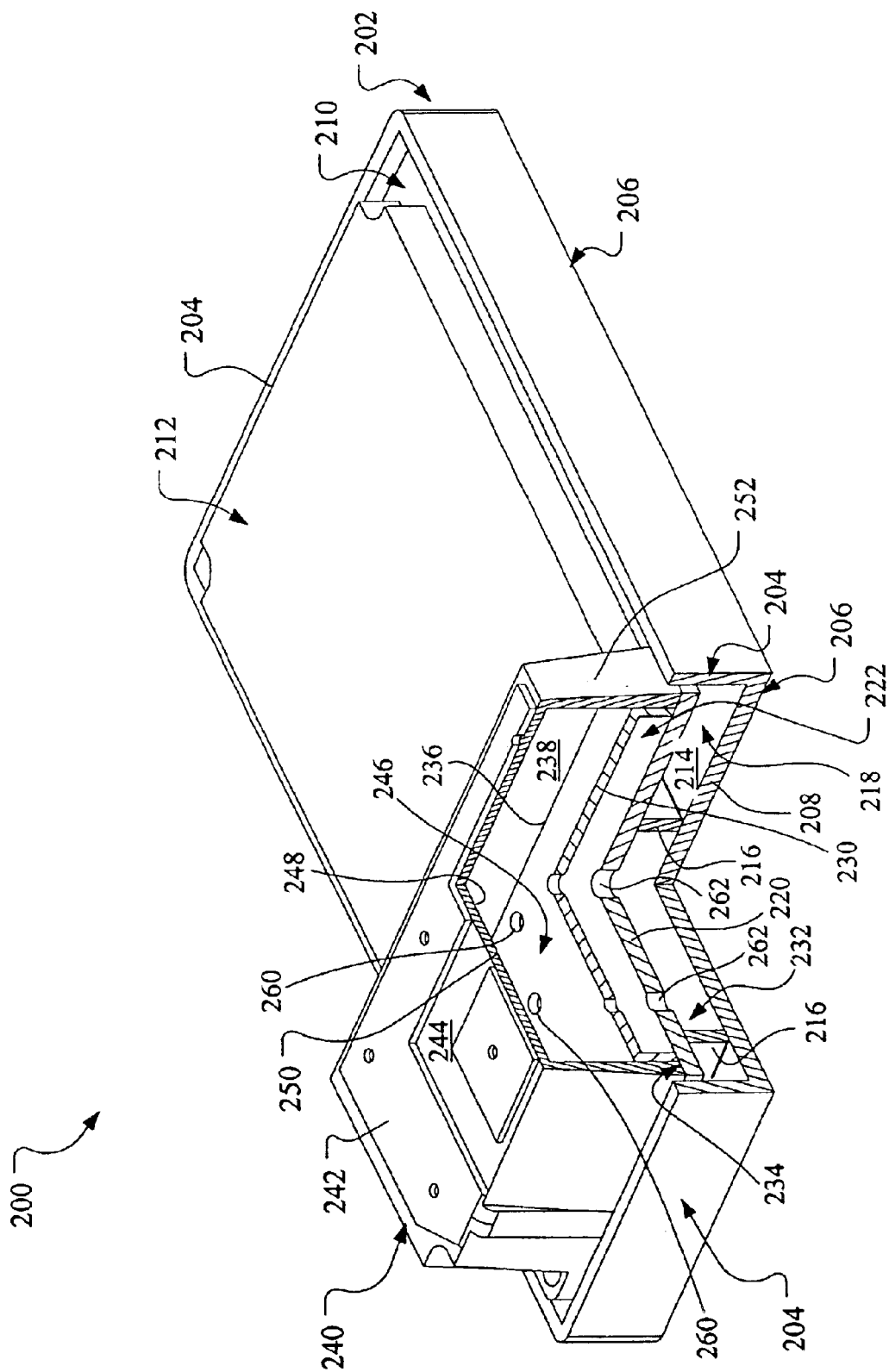
FIG. 5 is a schematic representation of an opened A-cover of the reduced size mobile communication device showing a combined antenna-speaker chamber alternate embodiment of the present invention.

Turning now to FIG. 5, a partially cut-away portion of an opened A-cover of a reduced size mobile communication device showing an alternate embodiment of a combined antenna-speaker chamber embodying the present invention is illustrated therein and generally designated 200. The A-cover, generally designated 202, includes an upwardly open wall section 204 generally located about the peripheral marginal edge region 206 extending from the main cover wall 208 to define a housing structure 210 for carrying subassemblies, generally designated 212, which make up an operational communication device. A ground plate 220 in the illustrated embodiment of FIG. 5 is carried in a spaced relationship with respect to the inner wall surface 214 of the base wall 208 by means of standoffs or projections, generally designated 216, molded with or extending from the face 214 and which space defines a chamber volume therebetween, generally designated 218. A printed circuit board generally designated 230 is held in a spaced relationship with respect to the ground plate 220 and which circuit board 230 carries various electronic components and printed circuit paths for power and signal distribution and for other uses and functions well known to those skilled in the art of mobile communication devices.

A supporting structure generally designated 240 carries the planar antenna 242 on a face surface 244 of the structure 240. The supporting structure 240 includes downwardly extending walls 252 terminating at the ground plate 220 to form chamber volume generally designated 246 between the inner wall portion 248 of the structure 240 and the printed circuit board 230 sandwiched between the upper wall portion 250 of the structure 240 and the ground plate 220. The speaker, generally designated 232, is mounted such that the cone or sound emitting portion is in facing relationship with the surface 214 of the base 208. Sound or audio generated by the speaker is communicated through apertures or openings through the base surface in any well-known manner. The volume of the chamber 246 created within the antenna support structure 240 between the upper wall portion 250 and the printed circuit board 230, and the volume of the chamber 222 created between the printed circuit board 230 and the ground plate 220 provides the controlled volume back cavity for the speaker 232. Holes or apertures 260 extending through the circuit board 230 and apertures 262 extending through the ground plate 220 provide communication between the speaker 232 and the chamber 246 and chamber 222 to achieve the necessary acoustic volume to ensure that the speaker 232 provides sufficient audio volume for the proper operation of the speaker component. It should be noted that the chambers 246 and 222 are sealed chambers formed by engagement or contact between the marginal peripheral end 234 of the antenna supporting structure 240 with the corresponding mating surface area of the ground plate 220. Likewise, the edge 236 of the printed circuit board 230 may be in contact with the inner wall surface 238 of the antenna support structure 240. A suitable sealant may also be used along the intersecting surfaces of the antenna support walls 252, circuit board 230 and ground plate 220 to create a sealed controlled volume back cavity. Obviously, other configurations may be employed to provide the chamber volumes and the corresponding dimensions selected to produce the desired controlled volume back cavity. Accordingly, it can be seen that using the space within the planar antenna 242 support structure and the ground plate 220 to create an acoustic resonator allows the use of the newer developed speaker components for providing sufficient audio volume for the hands-free function without increasing the size of the mobile communication device.

A mobile communication device and related construction method for reducing the physical size of the device has been presented above in several preferred embodiments. Numerous changes and modifications may be made to the above embodiments without departing from the spirit and scope of the present invention. For example, the cover of the antenna-speaker chamber may be provided by a complementary mating surface of another portion of the housing for the mobile communication device. Accordingly, the present invention has been disclosed by way of example rather than limitation.

What is claimed is:

1. A mobile communication device of the type having an RF transmitter and receiver, an RF antenna and a speaker component, comprising:
   a housing structure for carrying subassemblies defining an operational communication device, said housing structure further comprising a contoured case having a base wall with an exterior surface and an interior surface;
   a common chamber defined within said housing structure for carrying both the speaker component and the RF antenna;
   said common chamber further comprising multiple acoustic cavities each having an acoustic volume wherein the sum of the volumes of said multiple acoustic cavities provide a speaker chamber having an acoustic volume to provide a desired acoustic characteristic from the speaker.

2. The mobile communication device as defined in claim 1, wherein said RF antenna further comprises a planar antenna.

3. The mobile communication device as defined in claim 2, wherein said planar antenna defines an internal antenna for providing RF functionality.

4. A mobile communication device having antenna functionality and speaker functionality, comprising:
   a housing structure for carrying subassemblies comprising an operational communication device; and
   an interior cavity within said housing structure having a predetermined volume for providing the antenna functionality and speaker functionality within said interior cavity;
   said interior cavity further defining a common chamber having multiple acoustic cavities in communication with one another for providing a speaker chamber having an acoustic volume to provide a desired acoustic characteristic from the speaker.

5. The mobile communication device as defined in claim 4, wherein said antenna functionality further comprises said interior cavity having a covering and a planar antenna carried on a surface of said covering.

6. The mobile communication device as defined in claim 5, further comprising said planar antenna carried on an outer surface of said covering.

7. The mobile communication device as defined in claim 5, further comprising said planar antenna carried on an inner surface of said covering.

8. The mobile communication device as defined in claim 5, wherein said interior cavity is an acoustic resonator.

9. The mobile communication device as defined in claim 8, further comprising said interior cavity having at least one acoustic leak hole for emitting sound produced by said speaker functionality.

10. A reduced size mobile communication device comprising:
    a housing structure comprising a contoured case having a base wall with an exterior surface and interior surface for carrying subassemblies defining an operational communication device;
    speaker means for producing audible sounds;
    antenna means for transmitting RF signals;
    cavity means within said housing structure for carrying both said speaker means and said antenna means, said cavity means further defining an antenna support structure having a common shared chamber,
    said common shared chamber further comprising multiple acoustic cavities in communication with one another, said multiple acoustic cavities further comprise:
    a first chamber defined between an upper wall portion of said antenna support structure and a printed circuit board (PCB) positioned a spaced distance below said upper wall portion;

a second chamber defined between said PCB and a ground plate positioned a spaced distance below said PCB;

a third chamber defined between said base wall and said ground plate positioned a spaced distance above said base wall;

said speaker means carried in said third chamber, and said first chamber and said second chamber providing a controlled volume back cavity defining an acoustic resonator chamber for said speaker means to provide a desired acoustic characteristic from said speaker means.

11. The reduced size mobile communication device defined in claim 10, wherein said antenna means further comprises a planar antenna.

12. The reduced size mobile communication device defined in claim 10, wherein said speaker means further comprises an audio transducer.

13. Method for construction of a mobile communication device having combined antenna and speaker component functionalities comprising the steps of:

providing an antenna supporting structure having a first wall outer surface generally transverse to peripheral walls extending therefrom, said peripheral walls further having end portions terminating at and intersecting with the surface of a ground plate; said first wall, peripheral walls and ground plate defining a first interior chamber volume therebetween;

mounting and locating a speaker component between the ground plate and a wall surface of the communication device in a region generally defined by the projection of the outline surface area of said antenna supporting structure first wall and peripheral walls on said communication device wall surface;

providing a printed circuit board for carrying electrical components defining the operational communication device and locating said printed circuit board in a spaced relationship between said first wall and said ground plate;

providing means for communication between said first interior chamber volume and said speaker component to define a controlled volume back cavity to provide a larger volume acoustic resonator chamber for air displaced by said speaker component to enhance the acoustic performance of the speaker component without increasing the size of the mobile communication device; and providing means in said printed circuit board for communication between first and second chamber portions created in said first interior chamber volume by said printed circuit board located therein whereby air displaced by said speaker component communicates with the controlled volume back cavity defined within said first interior chamber volume.

14. The method for construction of a mobile communication device as defined in claim 13, further comprising the step of providing a substantially pressure sealed first interior chamber volume.

15. The method for construction of a mobile communication device as defined in claim 13, further comprising the step of providing a planar antenna on said first wall outer surface.

* * * * *